United States Patent [19]

Werner

[11] Patent Number: 5,134,633
[45] Date of Patent: Jul. 28, 1992

[54] DIGITAL COMMUNICATIONS SYNCHRONIZATION SCHEME

[75] Inventor: Jean-Jacques Werner, Holmdel, N.J.

[73] Assignee: AT&T Bell Laboratories, Murray Hill, N.J.

[21] Appl. No.: 620,868

[22] Filed: Nov. 30, 1990

[51] Int. Cl.[5] .......................... H04K 1/10; H04L 1/02
[52] U.S. Cl. ......................................... 375/38; 375/40; 375/100; 340/825.01; 371/68.2; 455/8
[58] Field of Search .................. 375/38, 39, 40, 42, 375/48, 100, 107, 108, 109, 111; 340/825.01, 825.73, 825.74; 371/8.2, 68.2; 455/8, 139

[56] References Cited

U.S. PATENT DOCUMENTS

| | | | |
|---|---|---|---|
| 3,253,259 | 5/1966 | Jacoby | 340/825.01 |
| 3,990,009 | 11/1976 | Lentz | 340/825.01 |
| 4,234,956 | 11/1980 | Adderley et al. | 455/8 |
| 4,709,278 | 11/1987 | Lagadec | 360/26 |
| 4,734,920 | 3/1988 | Betts | 375/8 |
| 4,878,228 | 10/1989 | Takahashi | 455/8 |

Primary Examiner—Benedict V. Safourek
Assistant Examiner—Young Tse
Attorney, Agent, or Firm—David R. Padnes

[57] ABSTRACT

A synchronization scheme for use in digital communications systems selectively replaces data-representative symbols that would ordinarily be transmitted through a plurality of communications channels with associated replacement symbols that represent the data and provide a synchronization mechanism. In the receiver, the replacement symbols are detected and control circuitry which determines the difference in propagation delay between communications channels. Advantageously, this scheme can provide a determination of the propagation delay difference between communications channels while such channels are being used to transmit customer data and does not alter the timing or format of such data.

21 Claims, 3 Drawing Sheets

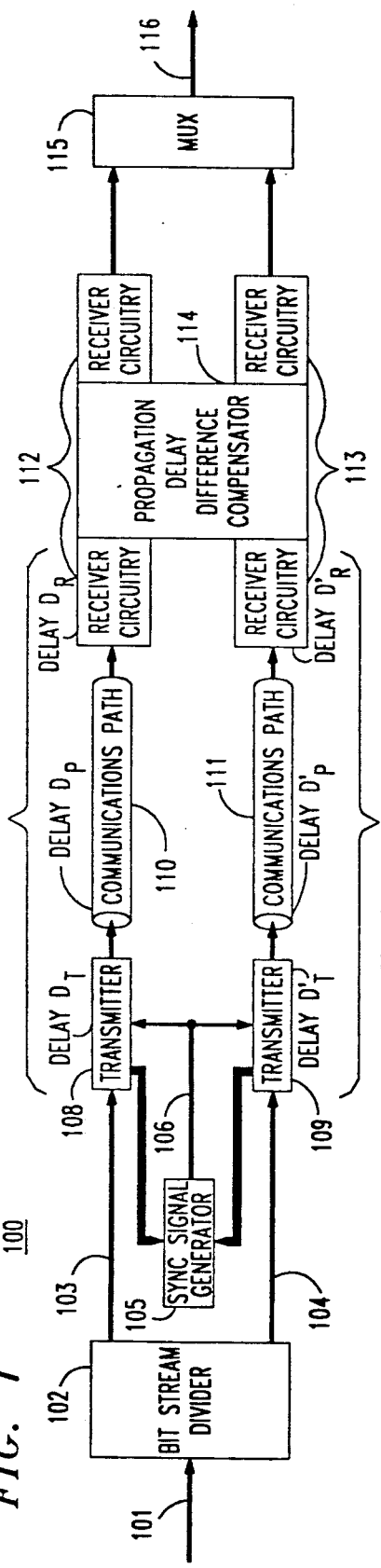
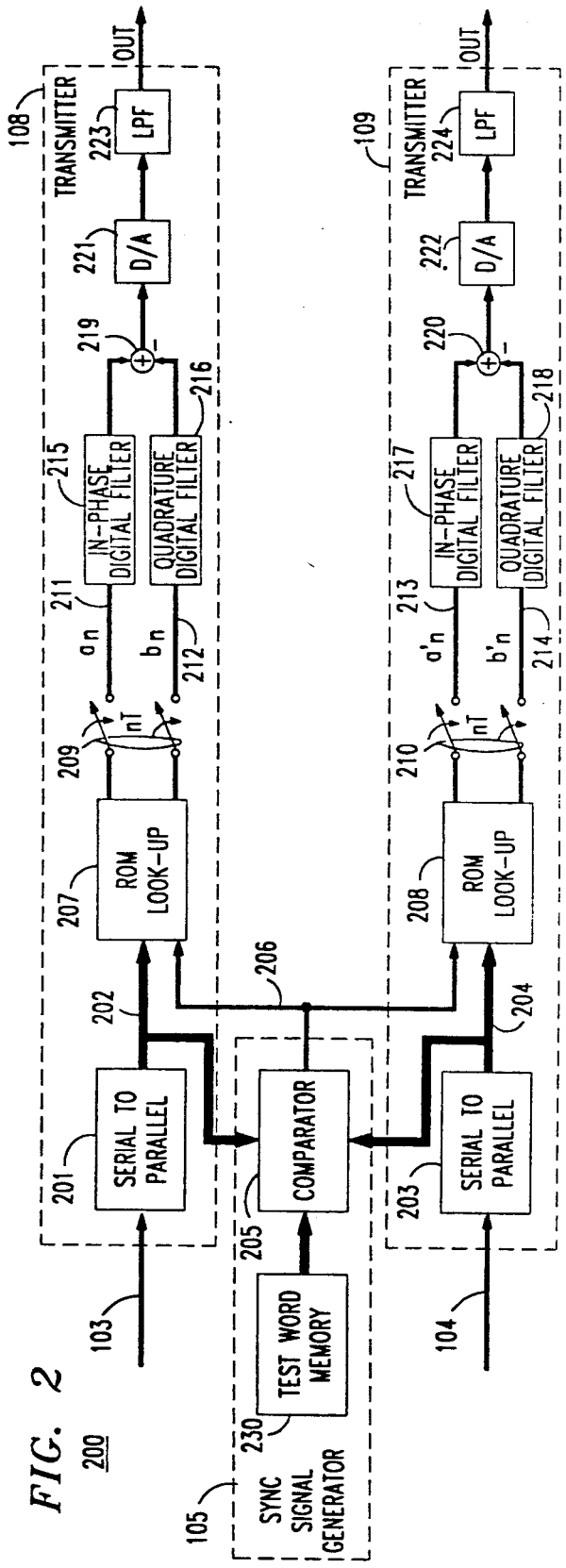
FIG. 1
FIG. 2

DIGITAL COMMUNICATIONS SYNCHRONIZATION SCHEME

TECHNICAL FIELD

The present invention relates to digital communications and, more particularly, to a technique for the synchronization of such communications.

BACKGROUND OF THE INVENTION

Digital communications systems are those in which the information or data communicated is represented by discrete symbols which may be directly transmitted or used to modulate a carrier signal. Synchronous digital transmission systems are those wherein the operation of the transmitter and receiver must be synchronized to one another to accurately recover the transmitted data.

A variety of architectures are used for synchronous digital communications systems. One such architecture is the so-called dual-duplex architecture. In a duplex system, the data is transmitted at some predetermined rate over a communications channel in two directions. Each communications channel includes transmitter and receiver circuitry along with a communications signal path therebetween. This communications signal path can take a variety of forms, such as wire, optical fibers, or air.

In a dual-duplex arrangement, the data at some predetermined rate is evenly divided for each direction of transmission over two communications channels so that the data rate in each channel is one-half of the predetermined rate. The problem with such an arrangement is that the propagation delay of each channel is generally different and this difference may vary with time. As a result, accurate recovery of the transmitted data is, in general, not possible unless this propagation delay difference is compensated for via some form of synchronization.

Until recently, the provisioning of local subscriber "loops", i.e., communication facilities connecting a customer's business or residential premises with a local central office in the public communications network for high-speed digital transmission, required an engineering of each loop to meet error rate objectives. This engineering involved the removal of bridge taps and the installation of specifically-spaced signal amplifiers or repeaters. In upcoming industry offerings for providing high-speed digital signals over local subscriber loops, the need for such engineering has been eliminated. However, to meet the necessary signal cross-talk requirements, a dual-duplex architecture has been found to be the preferred system architecture. As previously discussed, the use of such an architecture, in turn, requires that, for each direction of transmission, the transmission of data in each channel be synchronized to the other.

While a variety of digital signal synchronization techniques are known, each such arrangement possesses significant shortcomings. In one class of known arrangements, for example, framing bits are periodically transmitted and detected to maintain synchronization. The use of such bits, however, either reduces the data rate that would otherwise be available to the customer or increases the required channel bandwidth. In another class of known synchronization arrangements, one or more training sequences, each including at least one a priori known signal, is transmitted at predetermined times, e.g., system start-up or the like, and these sequences are used to measure the propagation delay. The problem with the use of training sequences is that the transmission of customer data must be interrupted each time a training sequence is transmitted, and infrequent training sequence transmission does not provide satisfactory results in certain system applications as there is no measurement of, or compensation for, propagation delay variations which arise in the time interval between successive training sequence transmissions.

Based on the foregoing, it would be extremely desirable if a synchronization arrangement could be devised for digital communications systems which would not affect the bandwidth or customer data rate and which could provide frequent propagation delay determinations without interrupting the transmission of customer data.

SUMMARY OF THE INVENTION

Broadly speaking, the present invention overcomes the limitations of the prior art by selectively replacing information-representative symbols that would ordinarily be transmitted in a digital communications system with replacement symbols. Each replacement symbol represents the same information as its associated replaced symbol and provides a mechanism for synchronization. In the disclosed embodiment, which pertains to a dual-duplex communications system, one symbol in each channel is replaced by a replacement symbol when the transmitted symbols in the communications channels meet some predetermined condition. At the receiver, this replacement symbol in each channel is detected and used to control circuitry which measures the propagation delay differences between the two communications channels. Once this difference is determined, synchronization can be maintained by the adjustment of a delay element in an appropriate one of the communications channels. Advantageously, this technique can be applied to a variety of digital transmission systems other than a dual-duplex arrangement.

BRIEF DESCRIPTION OF THE DRAWING

FIG. 1 is a block-schematic diagram of an illustrative dual-duplex communications system in which the present invention is implemented;

FIG. 2 is a block-schematic diagram of an embodiment of a transmitter, in accordance with the present invention, for use in the communications system of FIG. 1;

DETAILED DESCRIPTION

Figure 3:
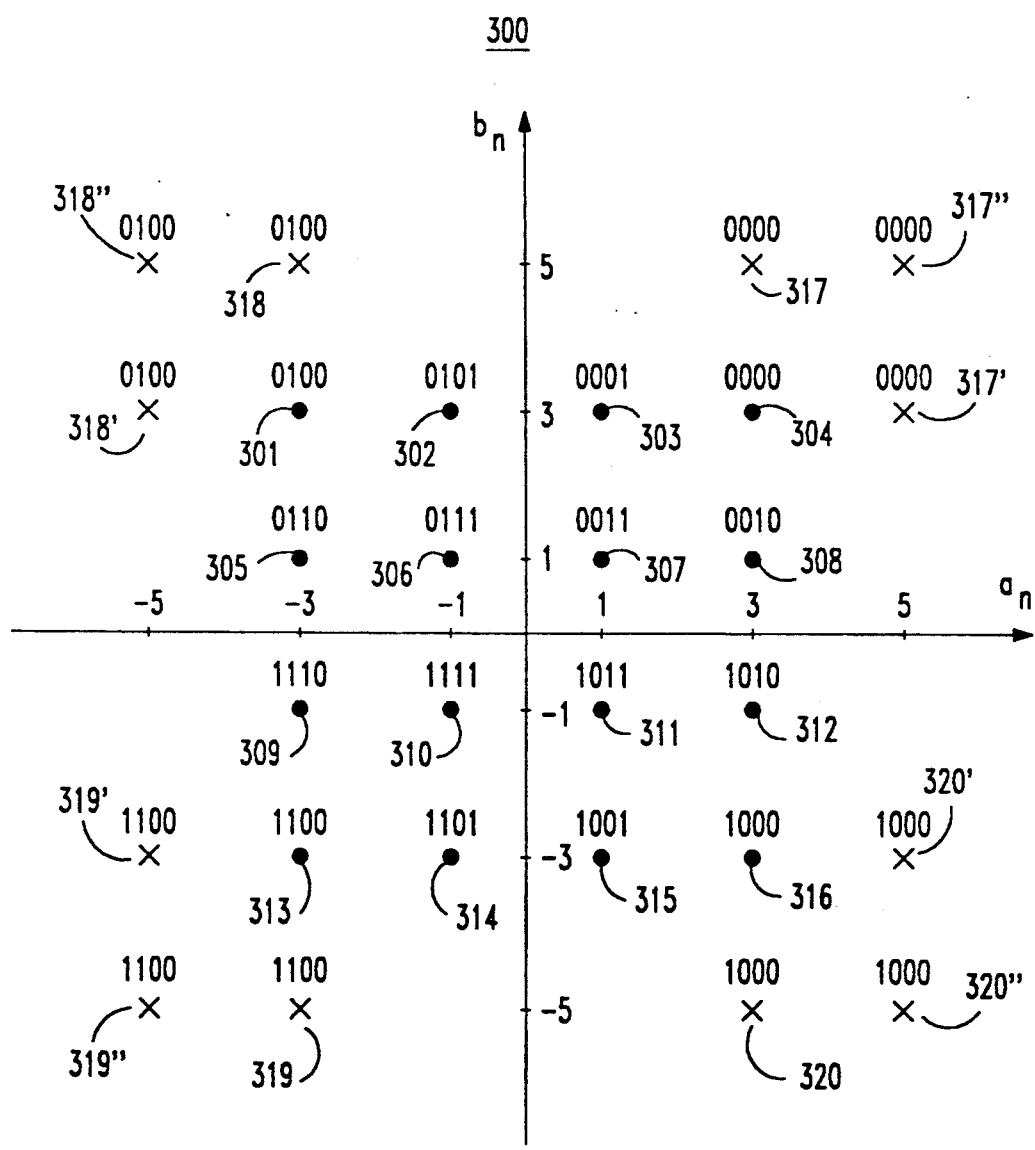
FIG. 3 is the signal constellation illustratively utilized by the communications system of FIG. 1.

In the exemplary dual-duplex communications system 100 of FIG. 1, digital data on lead 101, in the form of bits at some predetermined bit rate, is processed by bit stream divider 102 to provide two bit streams on leads 103 and 104. The bit rate on each of leads 103 and 104 is one-half of that on lead 101. Synchronization (Sync) signal generator 105 examines the digital data on leads 103 and 104 and, when a predetermined condition is met, provides synchronization data which maintains proper system operation and thereby insures the later accurate recovery of the digital data on lead 101 in the receiver of communications system 100. The synchronization data provided by generator 105 appears on lead 106. The synchronization data and the digital data on lead 103 are then coupled through communications channel 150 while the synchronization data and digital data on lead 104 are coupled through communications channel 160. Communications channel 150 includes transmitter 108, communications path 110 and a portion of receiver 112, respectively having propagation delays of $D_T$, $D_P$ and $D_R$, and communications channel 160 includes transmitter 109, communications path 111 and a portion of receiver 113, respectively having propagation delays of $D'_T$, $D'_P$ and $D'_R$. While the transmitters 108, 109, communications paths 110, 111 and receivers 112, 113 may be identical in structure and type, the propagation delays for communications channels 150 and 160 may be different and may vary with time. Consequently, a delay compensation mechanism, represented by propagation delay difference compensator 114, is provided within receivers 112 and 113. Multiplexer (Mux) 115 combines the outputs of receivers 112 and 113 to provide the output bit stream on lead 116 which, during proper system operation, is identical to that of lead 101. While system 100 is a dual-duplex system in which data is transmitted in both directions, i.e., left to right and vice versa in FIG. 1, for purposes of simplicity, the circuitry associated with the right-to-left direction of transmission in FIG. 1 has not been shown. This simplification is also utilized in FIGS. 2 and 4. This circuitry for the right-to-left direction of transmission in FIG. 1, as is well known, would include circuitry identical to that shown for the left-to-right direction of transmission along with well-known hybrid and echo canceller apparatus.

FIG. 2 shows a transmitter 200, in accordance with the present invention, for use in the system of FIG. 1. Transmitter 200 includes transmitters 108 and 109 of FIG. 1. At this juncture, it will be assumed that system 100 utilizes a carrierless amplitude modulation/phase modulation (AM/PM) format and, more specifically, a 16 AM/PM format for each communications channel. In this type of transmission format, a complex-valued symbol having two real-valued symbol components is transmitted through each communications channel in each symbol period. It will be understood, of course, that the present invention is not limited to this specific passband modulation format and, indeed, can be utilized with virtually any passband modulation or baseband transmission format including those wherein a single multilevel symbol having only one component is transmitted through each communications channel and those, such as dual polarization schemes, which transmit two symbols in orthogonal polarizations through each communications channel during a symbol period.

Referring to FIG. 2, the serial bit streams of leads 103 and 104 are respectively coupled to serial-to-parallel converters 201 and 203. Each of these converters provides its output on a 4-lead bus. The buses are designated as 202 and 204 for converters 201 and 203, respectively. ROM look-up tables 207 and 208 respectively convert the four-bit outputs of converters 201 and 203 to the predetermined symbol component values of each symbol used in the 16 AM/PM modulation. As is well known, each symbol component value is used as an input of a different associated one of a pair of quadrature-phase-related digital filters, as will be described hereinbelow, and then combined to form a single symbol. Moreover, in the exemplary dual-duplex system 100, the value of this symbol in one communications channel is independent of the symbol value in the other communications channel. Since the symbol values in one of the communications channels are independent of the symbol values in the other communications channel, at any instant, the symbol value in one communication channel may be the same or may be different from the symbol value in the other communication channel. Accordingly, the ordered sequence of symbols coupled through one communications channel could conceivably be the same as the ordered sequence of symbols coupled through the other communications channel or these sequences could be different from one another. In general, such sequences will be different from one another.

To provide synchronization between the two communications channels, synchronization signal generator 105, including three-way comparator 205 and test word memory 230, is added to transmitter 200. These added components provide replacement symbols in lieu of the symbols that would ordinarily be transmitted to represent the digital data upon the occurrence of a predetermined condition. More specifically, comparator 205 provides a digital output which alters the symbol component values that would ordinarily be generated by ROM look-up tables 207 and 208 in response to the digital data on buses 202 and 204 to one or more distinct and otherwise unused symbol component values upon the occurrence of the predetermined condition. Comparator 205 detects the predetermined condition by comparing the four bits on each of buses 202 and 204 with one or more prestored multibit test words stored in test word memory 230. In the disclosed embodiments of the present invention, the predetermined condition is that the combination of four bits on buses 202 and 204 is the same and matches any of the prestored test words.

Refer now to FIG. 3 which shows an illustrative 16 AM/PM signal constellation 300 used in implementing the present invention. Constellation 300 includes sixteen signal constellation points 301 through 316 wherein each signal point, as is well known, is representative of a different combination of four bits and each such combination is not transmitted as such but, instead, is represented by a symbol having a pair of symbol components, designated as $a_n$ and $b_n$. For example, signal point 307 is representative of the four-bit combination 0,0,1,1 on bus 202 or bus 204 and this combination in the 16 AM/PM format corresponds to a symbol whose $a_n$ and $b_n$ symbol component values are $+1$ and $+1$. The above description of a 16 AM/PM format, as described above, is conventional and well known. Now, however, pursuant to an embodiment of the present invention, when the bits on bus 202 are the same as the bits on bus 204 and, more particularly, have the values of 0,0,0,0, this four-bit combination is not represented by the symbol associated with signal point 304. Instead, this four-bit combination is represented in the 16 AM/PM format by a replacement symbol whose $a_n$ and $b_n$ symbol component values are $+3$ and $+5$, respectively, and thereby representative of replacement signal point 317. As will be described, the use of the replacement symbol representative of replacement signal point 317, in lieu of the symbol representative of conventional signal point 304, permits receiver circuitry to determine any difference in the propagation delay of the two communications channels in the dual-duplex system.

Other replacement signal points for signal point 304 are also possible. One such other replacement signal point is designated as 317' and has an $a_n$ symbol component value of +5 and a $b_n$ symbol component value of +3. Another possible replacement signal point is designated as 317" and has an $a_n$ symbol component value of +5 and a $b_n$ symbol component value of +5. Use of replacement signal point 317" is advantageous in applications where greater noise immunity is desired and peak power is not limited. Replacement signal point 317" provides greater noise immunity than either replacement signal points 317 or 317' because the distance between replacement signal point 317" and signal point 304 is greater than the distance between either replacement signal point 317 or 317' and signal point 304.

It should be noted that if there is a uniform distribution of bit values on buses 202 and 204, then the probability of the bit values 0,0,0,0 simultaneously appearing on both of these buses is $$\frac{1}{16} \times \frac{1}{16} \text{ or } \frac{1}{256}.$$

Thus, on average, the symbol corresponding to signal point 317 which provide synchronization capabilities will be sent once every 256 symbol periods. In applications where still more frequent synchronization information is required, additional ones of the remaining signal points 301-303 and 305-316 in a conventional 16 AM/PM signal constellation could be replaced by associated replacement signal points. For example, the respective $a_n$ and $b_n$ symbol component values of −3 and +3, representative of the four-bit combination 0,1,0,0 and signal point 301, can be replaced with $a_n$ and $b_n$ symbol component values of −3 and +5, representative of replacement signal point 318. Or, the $a_n$ and $b_n$ symbol component values representative of signal points 313 and 316 and their associated four-bit combinations can be respectively replaced by the $a_n$ and $b_n$ symbol component values of replacement signal points 319 and 320. As a result, replacement signal points 319 and 320 respectively represent the same four-bit combinations as their associated signal points 313 and 316 with the $a_n$ and $b_n$ symbol component values of −3, −5 and +3, −5. In the above-described use of replacement signal points, the generation of a replacement symbol requires only changing the $b_n$ symbol component value for selected $a_n$ symbol component values. More specifically, a $b_n$ symbol component value of +3 is replaced by a $b_n$ symbol component value of +5 while a $b_n$ symbol component value of −3 is replaced by a $b_n$ symbol component value of −5. Such replacement readily permits receiver circuitry to detect the presence of a symbol having any $a_n$ symbol component value and a $b_n$ symbol component value of +5 in one communications channel and then activate time measurement circuitry which would operate until a symbol having such $a_n$ and $b_n$ symbol component values is detected in the other communications channel. The measured time interval is equal to the difference in propagation delay between the two communications channels.

As with replacement signal point 317, other replacement signal points for signal points 301, 313 and 316 can be used. For example, either replacement signal point 318' or 318" can replace signal point 301, or replacement signal points 319' or 319" can replace signal point 313, or replacement signal points 320' or 320" can replace signal point 316. As discussed above, the use of double-primed replacement signal points 318", 319" and 320" is preferably in applications where greater noise immunity is desired and peak power is not limited.

The use of four otherwise unused replacement signal points 317, 318, 319 and 320 to represent the conventional 16 AM/PM signal points 304, 301, 313 and 316, respectively, provides synchronization information four times as frequently as with the use of only one replacement signal point. This would provide synchronization information every 64 symbol periods, on average. The substitution of an otherwise unused replacement symbol point to provide synchronization information could also be used in other larger constellation AM/PM modulation formats such as 64 AM/PM. It should be appreciated that in a 64 AM/PM format, the use of only one replacement signal point provides, on average, synchronization information once every $64^2 = 4096$ symbol periods. The use of four replacement signal points in such a format increases this rate to once every 1024 symbol periods.

Referring back to FIG. 2, the outputs of ROM look-up table 207 generate the values of symbol components $a_n$ and $b_n$ for one communications channel. Switch 209, which operates at a rate of nT, where T is the symbol period and n is a time index, couples the outputted symbol component values from ROM look-up table 207 to in-phase and quadrature digital filters 215 and 216 which provide filtered digital representations of a pair of the transmitted symbol component values. These representations are combined into one symbol by adder 219, converted to analog form by digital-to-analog (D/A) converter 221, filtered by low-pass filter (LPF) 223, and thence transmitted through communications path 110.

The 16 AM/PM signal for the other communications channel is generated in similar fashion from the symbol component values provided by ROM look-up table 208 using switch 210, in-phase and quadrature filters 217, 218, adder 220, D/A converter 222 and LPF 224. Switch 210 operates at the same rate as switch 209.

Figure 4:
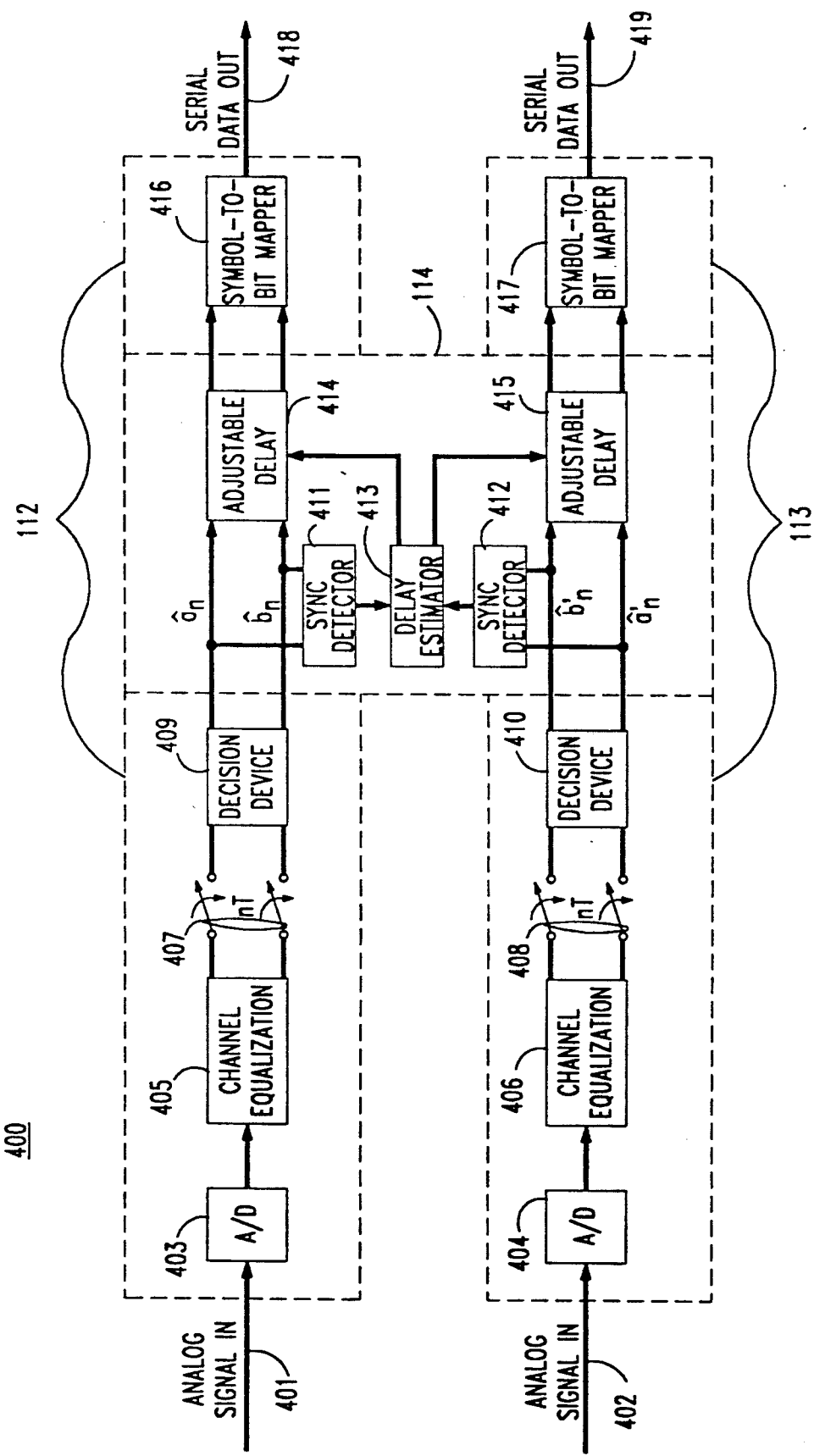
FIG. 4 is a block-schematic diagram of an embodiment of a receiver, in accordance with the present invention, for use in the communications system of FIG. 1.

Refer now to FIG. 4, which shows receiver circuitry pursuant to the present invention which determines the difference in propagation delay between the two communications channels in a dual-duplex architecture. In receiver 400, the two received analog signal are respectively coupled via leads 401 and 402 to A/D converters 403 and 404 which form digital representations thereof. Each received analog signal is a different one of the transmitted AM/PM signals plus additive noise. Estimates of the transmitted $a_n$ and $b_n$ symbol component values for communications channel 150, respectively designated as $\hat{a}_n$ and $\hat{b}_n$, and for communications channel 160, respectively designated as $\hat{a}'$ and $\hat{b}'_n$, are generated in conventional fashion by first removing distortion via channel equalizers 405 and 406 and thence coupling the equalized outputs thereof through switches 407 and 408 to decision devices 409 and 410. Now, to provide an estimate of the difference in propagation delay between the two communications channels of a dual-duplex architecture, synchronization detectors 411 and 412, within propagation delay difference compensator 114, examine the received symbols from the communications channels for the presence of a symbol representative of a replacement signal point. In the exemplary replacement scheme utilizing replacement signal point 317 for signal point 304, this examination involves examining the received symbols for the presence of a symbol whose $\hat{a}_n$ value is +3 and whose $\hat{b}_n$ value is +5. Of course, alternate replacement signal points 317' or 317" can be used instead of replacement signal point 317.

Once the symbol associated with the replacement signal point is detected by either one of synchronization detectors 411 or 412, delay estimator circuitry 413 is activated. Once circuitry 413 is activated, time interval measurement apparatus therein is operative until the symbol having estimated symbol component values of $a_n = +3$ and $b_n = +5$ is detected in the other communications channel. The delay estimator circuitry then ceases operation and the measured time interval is used to adjust the appropriate one of adjustable delay elements 414 or 415 to compensate for difference in propagation delay. Preferably, the delay estimator circuitry forms an average of a plurality of time interval measurements and uses this average to adjust the delay of the appropriate one of adjustable delay elements 414 or 415. The estimated symbol values are coupled through such delay elements and are then supplied to symbol-to-bit mappers 416 and 417. Mappers 416 and 417 respectively map the pair of estimated symbol component values recovered from each communications channel into the corresponding four-bit combinations. Such four-bit combinations appear on leads 418 and 419.

In the described use of four replacement points 317, 318, 319 and 320, the operation of receiver 400 is substantially similar except that the symbols whose $\hat{a}_n$ and $\hat{b}_n$ symbol component values are $+3, +5$, or $-3, +5$, or $-3, -5$ or $+3, -5$, and are respectively representative of replacement signal points 317-320, are detected by synchronization detectors 411 or 412. Once any of these four symbols is detected in either communications channel, delay estimator circuitry 413 is activated until the same symbol is subsequently detected in the other one of the communications channels. As with replacement signal point 317, alternate replacement signal points 318' or 318" can be used in lieu of replacement signal point 318, replacement signal points 319' or 319" can be used in lieu of replacement signal point 319, or replacement signal points 320' or 320" can be used in lieu of replacement signal point 320. Use of different replacement signal points merely requires that synchronization detectors 411 and 412 be modified to detect the symbols associated with these alternate replacement signal points. While still other replacement signal points can be utilized, the aforementioned replacement signal points are preferable because an error in detecting any replacement signal point will most likely result in a loss of synchronization data and not a loss of the digital data on lead 101. This results from the fact that for any replacement signal point, the nearest one of the signal points 301 through 316, represents the same four-bit combination as that replacement signal point.

It should, of course, be understood that, while the present invention has been disclosed in reference to a specifically described embodiment, numerous alternative arrangements will be apparent to those of ordinary skill in the art. For example, while the disclosed embodiments utilize discrete devices, the devices can be implemented using one or more appropriately programmed general-purpose processors or special-purpose integrated circuits or digital processors or an analog or hybrid counterpart of any of these devices. In this regard, the specific generation of the symbols and replacement symbols can be accomplished in a number of ways. In addition, while the present invention has been disclosed in reference to a dual-duplex communications system communicating digital data, the invention is equally applicable to any digital communications system communicating information, i.e., voice, data, video, etc., through two or more communications channels wherein the direction of transmission in any communications channel can be duplex or simplex, i.e., only one direction. The present invention can also advantageously be combined with a variety of coding techniques such as trellis-coding. In such case, the desired coding would be applied via trellis encoders which would replace the ROM look-up tables 207 and 208 and the inverse coding operation would be applied to the outputs of equalizers 405 and 406. Furthermore, while the disclosed embodiments utilize one or four replacement signal points to provide synchronization data, the present invention can be used with other numbers of replacement signal points. In addition, the predetermined condition in the communications channels which causes the transmission of a replacement symbol in each channel need not be limited to the same digital data or representative symbol value occurring in each communications channel. Indeed, the predetermined condition can correspond to different digital data or symbols in each communications channel. Moreover, the predetermined condition can relate to the digital data or representative symbol in one channel at one time and the digital data or representative symbol in another channel at another time. This can easily be provided by utilizing a predetermined delay in the sync signal generator and sync detectors. Finally, upon the occurrence of this predetermined condition, the replacement symbol transmitted through one communications channel need not have the same value as the replacement symbol transmitted through another communications channel.

I claim:

1. Apparatus for use in a digital communications system wherein symbols representative of information are transmitted through a plurality of communications channels, said apparatus comprising means for supplying said information; and means responsive to said supplied information for providing said symbols for transmission through said communications channels, said providing means also providing a replacement symbol in lieu of one of said symbols for each of said channels upon an occurrence of a predetermined condition, each replacement symbol being different from any of said symbols and each replacement symbol and the symbol it replaces being representative of the same information.

2. The apparatus of claim 1 wherein said predetermined condition is that the symbol representative of the information to be transmitted through one communications channel at a symbol time would have a predetermined value and the symbol representative of the information to be transmitted through another communications channel at said symbol time would have said predetermined value.

3. The apparatus of claim 1 wherein said predetermined condition is that the symbol representative of the information to be transmitted through one communications channel at a symbol time would have a first predetermined value and the symbol representative of the information to be transmitted through another communications channel at said symbol time would have a second different predetermined value.

4. The apparatus of claim 1 wherein said predetermined condition is that one symbol representative of the information to be transmitted through one communications channel at a first symbol time and one symbol representative of the information to be transmitted through another communications channel at a second symbol time, said second symbol time being in a predetermined time relationship with said first symbol time, would have an identical predetermined value.

5. The apparatus of claim 1 wherein said predetermined condition is that one symbol representative of the information to be transmitted through one communications channel at a first symbol time would have a first predetermined value and one symbol representative of the information to be transmitted through another communications channel at a second symbol time would have a second predetermined value different from said first predetermined value, said second symbol time being in a predetermined time relationship with said first symbol time.

6. The apparatus of claim 1 wherein each replacement symbol has a value and the replacement symbols provided for said communications channels have the same value.

7. The apparatus of claim 1 wherein each replacement symbol has a value and the replacement symbols provided for said communications channels have values which are different from one another.

8. The apparatus of claim 1 wherein said digital communications system utilizes a transmission scheme which can be represented by a plurality of signal points in a signal constellation and said providing means replaces the symbol values associated with a subset of signal points in said signal constellation with replacement symbol values, each replacement symbol value being associated with a replacement signal point in said signal constellation which are unused except upon detection of said predetermined condition.

9. The apparatus of claim 1 wherein said providing means includes at least one memory device for providing said symbols and said replacement symbol and each replacement symbol is generated by said providing means by modifying inputs to said memory device.

10. Apparatus for use in a digital communications system wherein symbols representative of information are received from a plurality of communications channels, each of said communications channels having propagation delay, said apparatus comprising
means for detecting said received symbols from each communications channel; and
means responsive to certain detected received symbols for determining any difference in signal propagation delay between said communications channels, each of said certain detected received symbols being a replacement symbol which was transmitted in lieu of one of said symbols for each of said channels upon an occurrence of a predetermined condition, each replacement symbol being different from any of said symbols and each replacement symbol and the symbol it replaces being representative of the same information.

11. The apparatus of claim 10 wherein said determining means forms averages of any difference in signal propagation delay between said communications channels.

12. The apparatus of claim 10 further including means responsive to the determined difference in signal propagation delay for compensating for any such difference.

13. The apparatus of claim 12 wherein said compensating means includes an adjustable signal delay element.

14. The apparatus of claim 10 wherein said determining means is activated by detection of a first replacement symbol from one communications channel and deactivated by detection of a second replacement symbol from another communications channel.

15. The apparatus of claim 14 wherein each received symbol has one of a plurality of values and said first and second replacement symbols each has a value in a subset of the plurality of symbol values.

16. The apparatus of claim 15 wherein the first replacement symbol value and the second replacement symbol value are the same.

17. The apparatus of claim 15 wherein the first replacement symbol value and the second replacement symbol value are different from one another.

18. The apparatus of claim 15 wherein said subset includes at least one symbol value.

19. A digital communications system wherein symbols representative of information are transmitted through a plurality of communications channels, each of said communications channels having signal propagation delay, said system comprising
a transmitter comprising
means for supplying said information; and
means responsive to said supplied information for providing said symbols for transmission through said communications channels, said providing means also providing a replacement symbol for in lieu of one of said symbols for each of said channels upon an occurrence of a predetermined condition, each replacement symbol being different from any of said symbols and each replacement symbol and the symbol it replaces being representative of the same information;
and a receiver comprising
means for detecting said received symbols from said communications channels; and
means responsive to certain detected received symbols for determining any difference in signal propagation delay between said communications channels.

20. A method for use in a digital communications system wherein symbols representative of information are transmitted through a plurality of communications channels, said method comprising the steps of
providing a replacement symbol in lieu of one of said symbols for each of said channels upon an occurrence of a predetermined condition, each replacement symbol being different from any of said symbols and each replacement symbol and the symbol it replaces being representative of the same information;
detecting said replacement symbols from said communications channels; and
determining any difference in signal propagation delay between said communications channels in response to said detected replacement symbols.

21. Receiver apparatus for use in a digital communications system wherein symbols representative of information are transmitted through a plurality of communications channels, each of said communications channels having propagation delay, said apparatus comprising
means for detecting received replacement symbols from each of said communications channels, each replacement symbol being transmitted in lieu of one of said symbols, each replacement symbol being different from any of said symbols and each replacement symbol and the symbol it replaces being representative of the same information; and
means responsive to replacement symbols from each of said communications channels for determining any difference in signal propagation delay between said communications channels.

* * * * *